July 8, 1958     J. F. ZALESKI     2,842,762
METHOD AND MEANS FOR MEASURING RELATIVE VELOCITY
Filed Sept. 23, 1948     2 Sheets-Sheet 1

Inventor
JOHN F. ZALESKI
By H. A. Mackey
Attorney

July 8, 1958 J. F. ZALESKI 2,842,762
METHOD AND MEANS FOR MEASURING RELATIVE VELOCITY
Filed Sept. 23, 1948 2 Sheets-Sheet 2

Inventor
JOHN F. ZALESKI
By
Attorney

United States Patent Office 2,842,762
Patented July 8, 1958

2,842,762
METHOD AND MEANS FOR MEASURING RELATIVE VELOCITY

John F. Zaleski, Queens Village, N. Y., assignor to General Precision Laboratory Incorporated, a corporation of New York Application September 23, 1948, Serial No. 50,861

9 Claims. (Cl. 343—8)

This invention relates to a system for the measurement of the relative velocity of two bodies by observation of the Doppler shift in a microwave frequency.

In pulsed microwave Doppler systems heretofore developed for measurements such as the velocity of an aeroplane relative to the surface of the earth, the output of a coherent oscillator has been employed for comparison with the received, dopplerized signal. By coherent oscillator is meant one that oscillates in phase with the pulse generator so that when the received signal is compared with the output of the coherent oscillator the phase relations will be the same as if the received signal were compared directly with the pulse which generated it. The name "coherent oscillator" is frequently abbreviated to "coho."

In such Doppler systems a stable local microwave generator also has frequently been employed for producing, by mixing its output with the received signal, energy having a beat intermediate frequency which is then amplified by conventional intermediate frequency techniques. Such a microwave generator may be, for instance, a reflex klystron with automatic frequency control operating at 8970 mc. to produce, when mixed with a magnetron generator frequency of 9000 mc., a beat frequency of 30 mc. The name "stable local microwave generator" is frequently abbreviated to "stalo." This name is applied only to microwave generators and not to intermediate frequency generators producing 30 to 60 mc. frequency.

One such Doppler system employing both coherent microwave oscillators and stable local microwave oscillators is described in the copending application, Serial No. 49,926, filed September 18, 1948, of F. B. Berger, et al.

In the design of a pulsed Doppler system employing a coherent oscillator either the oscillator must be phased anew by the pulsed oscillator at each pulse, and must maintain its phase coherence with great stability for the interval between pulses, or else the coherent oscillator must force the pulsed generator to start each pulse in phase with it, without itself being affected in phase stability. These requirements introduce design complexities. Also, in the design of a pulsed Doppler system employing a stable local microwave oscillator to produce an intermediate beat frequency, the oscillator must be frequency stable to such a degree that its phase will not shift substantially during the interval between pulses, a stringent requirement at microwave frequencies.

The present invention eliminates the coherent microwave oscillator and the stable local microwave oscillator, and substitutes for both a single device, namely, a microwave-resonant cavity. This device is inherently stable in frequency and, because it simply stores and re-emits microwave energy and does not generate it, may be simple in design and substantial in construction.

The essential purpose of this invention, therefore, resides in providing a system wherein a single rugged mechanism is utilized to supplant both a coherent local oscillator (coho) and a stable local microwave generator (stalo) resulting in a system which is at one and the same time simpler, more substantial and less likely to get out of adjustment.

The exact nature of the invention will be more apparent from the following detailed description when taken with the accompanying drawings, in which.

Figure 1:
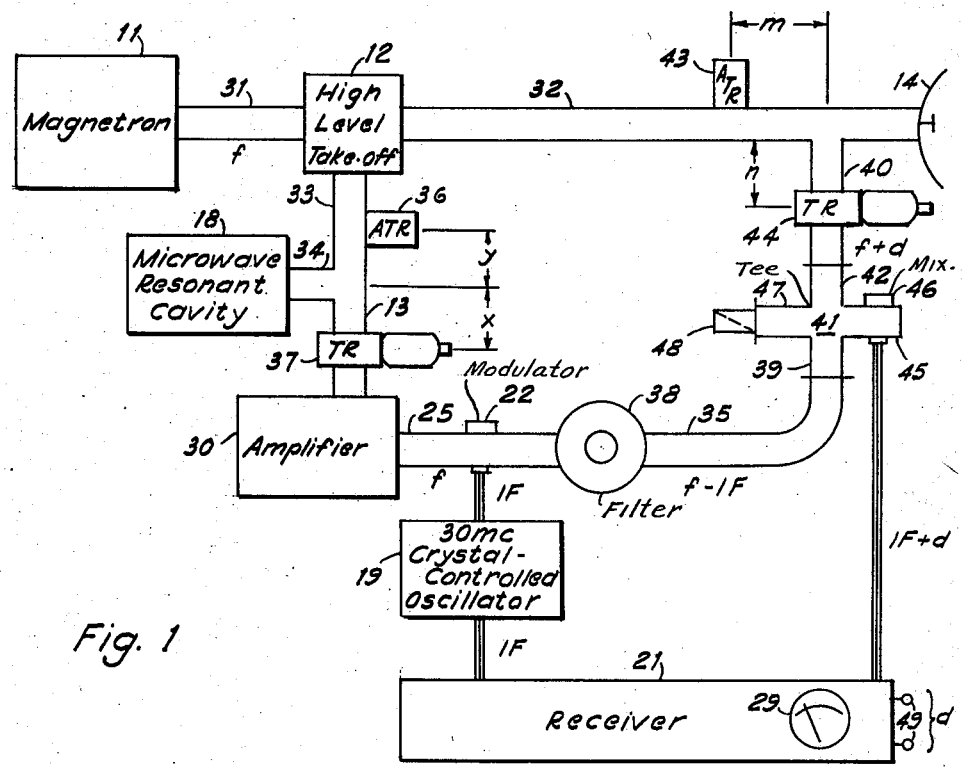
Figure 1 is a schematic diagram of a system incorporating the invention.

Referring now to Fig. 1 a pulsed microwave generator 11 which may conveniently be of the magnetron type generates pulse signals of a frequency $f$ which may fall within the K, X, S or other microwave band suitable for the purposes of measurement based on the Doppler principle.

The pulse signals so generated are transmitted through a wave guide section 31, take-off 12, wave guide section 32 to an antenna of any desired construction where they are radiated in a suitable direction to permit reflection thereof. For example, the apparatus illustrated may be mounted on an aeroplane and the signals radiated towards the earth's surface in which case the reflected signals will differ in frequency from the transmitted signals by an amount $d$ namely, the Doppler shift in frequencies.

These reflected signals now having a frequency $f+d$ are received by the antenna 14 and transmitted through wave guide 40 to suitable receiving and mixing means, to be described more fully hereinafter.

In order that the transmitted and received signals may be directed only in the proper paths despite the fact that a single antenna 14 is used for both transmission and reception of signals, an ATR tube 43 is connected to the wave guide section 32 at a suitable distance from the juncture of sections 32 and 40 and a TR tube 44 is inserted in the wave guide section 40 at a suitable distance from the same juncture. As is well understood in the radar art, the high energy level of the pulse signals generated by the magnetron 11 will cause both the ATR tube 43 and the TR tube 44 to fire and these signals will be transmitted only to the antenna 14, being blocked from affecting the delicate receiving apparatus by the firing of the TR tube 44, which in effect short-circuits the wave guide section 40 at its juncture with the wave guide section 32. On the other hand received signals are of low energy level so that ATR tube 43 and TR tube 44 are not fired and the wave guide section 32 is open circuited for these signals but they are permitted to pass freely through the wave guide section 40 to the receiving apparatus.

A portion of the energy contained in the pulse signals generated by the magnetron 11 is transmitted to the wave guide section 33 through the take-off 12, which may conveniently be a simple iris in the wave guide section 31, a probe, or loop, or a directional coupler as the occasion demands.

A microwave-resonant cavity 18 is connected through the medium of a wave guide section 34 to the wave guide section 33 for reception of the pulsed signals transmitted to the guide 33 through the take-off 12.

Figure 2:
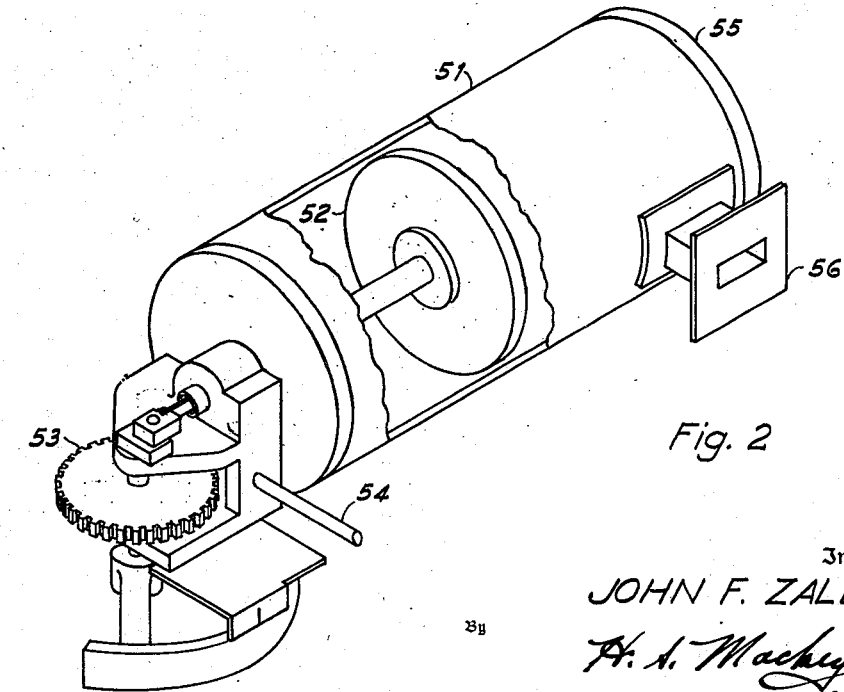
Figure 2 illustrates one form of microwave-resonant cavity.

This microwave-resonant cavity may be of the form as disclosed more in detail in Fig. 2 wherein it is illustrated as a hollow metal cylinder 51 containing a piston 52 whose position is longitudinally adjustable by rotation of the shaft 54 and gearing 53. The longitudinal adjustment of the piston 52 varies the length of the internal cavity existing between the face of the piston 52 and the end 55 so that the cavity may be adjusted to resonate at any desired frequency. A fitting 56 constitutes an attachment for a wave guide so that microwave signals may be introduced into and transmitted out of the cavity. Such ingress and egress may be provided by a single aperture or iris, separate irises may be used or coupling may be constituted by probes or loops as is well understood in the art.

The pulse signals generated by the magnetron 11 and impressed on the resonant cavity 18 result in oscillation or ringing of this cavity and the signals occasioned by this oscillation or ringing are transmitted through guide 13 to amplifier 30. These oscillations being at the natural period of the cavity and excited through loose coupling from the magnetron are equal in frequency and in the same phase as the magnetron oscillations, that is, the cavity is phase-coherent with the magnetron.

Instead of a single cavity as described above, there may be employed a series of cavities which are arranged in cascade, the free resonant oscillations of one exciting the next to begin oscillating and thus prolonging the total time of persistence of any useful free oscillations. On the other hand, the cavities may be arranged in parallel, all being simultaneously excited by the magnetron and giving a combined output of energy greater than could be given by one alone. Such cavities also may be arranged in series-parallel or parallel series combinations, resulting in longer ringing time with higher output energy levels.

In order that the signals received and emitted by the microwave-resonant cavity 18 may be directed only in the proper paths, an ATR tube 36 is connected to the wave guide 33 between take-off 12 and microwave-resonant cavity 18 and at a suitable distance from the junction with guide 34, and TR tube 37 is inserted in the wave guide 13 at a suitable distance on the opposite side of the same junction. As is well understood in the radar art, the high energy level of the pulse signals generated by the magnetron 11 and taken off into guide 33 through take-off 12 will cause both the ATR tube 36 and the TR tube 37 to fire, and these signals will be transmitted only to the microwave cavity 18, being blocked from passing on to the amplifier 30 by the firing of TR tube 37, which in effect short-circuits the wave guide section 13 just below its juncture with the wave guide section 34. On the other hand, energy emitted by the oscillating microwave-resonant cavity 18 after its excitation by magnetron 11 has ceased is of low level so that ATR tube 36 and TR tube 37 are not fired. Thus the wave guide section 33 is open-circuited at the location of ATR tube 36 for these signals but they are permitted to pass freely through the wave guide section 13 to the amplifier 30.

The use of ATR tube 36 and TR tube 37 is preferred, but their omission will not prevent operation, simply reducing the efficiency of operation.

The signals produced by the free oscillation or ringing of microwave-resonant cavity 18 persist long enough after the termination of the pulse generated by magnetron 11 to bridge the time between that termination and the reception of the reflected pulse by antenna 14, and have both the same frequency and the same phase as the signals of generator 11. The signals resulting from oscillation of the microwave-resonant cavity are transmitted through wave guide 13 and are preferably amplified by microwave amplifier 30, which may be of any type for the amplification of microwaves, such as a klystron tube or the like. Its inclusion is preferable but is not essential to the operation of the circuit.

The amplified signals of frequency $f$ in wave guide 25 are impressed on a crystal modulator 22 which is also energized by energy derived from an intermediate generator 19, preferably crystal-controlled, generating continuous wave signals of a frequency I. F. say 30 to 60 megacycles. These signals are modulated or mixed by the modulator 22 resulting in signals having frequencies $f+$I. F. and $f-$I. F. These signals are impressed on a filter 38, which passes signals of only one frequency, such as $f-$I. F. and bars signals of all other frequencies. Filter 38 is preferably of the tunable cavity type such as is customarily used for wavemeter purposes.

The microwave energy of frequency $f-$I. F. passed by filter 38 is led through wave guide 35 to arm 39 of hybrid junction ("magic tee") 41, while aforesaid reflected signals transmitted through wave guide 40 are at the same time led to the collinear arm 42 of the same hybrid junction. The frequency of the latter energy is that of the generator modified by the Doppler shift, or $f+d$.

The hybrid junction 41 is depicted in a single plane for simplicity, but arms 39 and 42 are intended to represent collinear arms, arm 45 the shunt arm and arm 47 the series arm. In place of this form of junction any other form having similar properties, such as the "rat race" form, or even a properly matched tee may be employed. An output which is substantially proportional to the sum of the two inputs is derived from arm 45 and energizes a mixer 46, which may be of the crystal type. The mixer 46 mixes the inputs impressed on arms 42 and 39 and delivers the modulation products thereof, including a signal of the frequency I. F.$+d$, through a guide 16 which may be a coaxial cable to a receiver 21. The fourth arm 47 of hybrid junction 41 is nonreflectively terminated by absorber 48.

Receiver 21 has as its function the development of the Doppler signal, usually of audio frequency. This receiver may comprise an intermediate frequency amplifier energized by the signal output derived from the mixer 46, an intermediate frequency amplitude limiter section and a mixing network or demodulator fed by the limiter output and also by intermediate frequency oscillator 19. As heretofore described the signals derived from the mixer 46 have a frequency I. F.$+d$ while those derived from the oscillator 19 have a frequency I. F.. The mixing and demodulating of these two signals, therefore, results in a signal having the frequency $d$, namely, the Doppler frequency desired to be obtained. This signal of the Doppler frequency may be impressed on the output terminals 49 for utilization purposes and its frequency may be further indicated on the indicator 29.

Thus the microwave energy generated by the magnetron is radiated, reflected and received but changed in frequency by the amount of the Doppler shift. The received signal is compared with a signal whose frequency is derived from the magnetron but which is momentarily stored in the microwave-resonant cavity, and the difference in frequency of the received and stored signals which constitutes the Doppler shift in frequency, is developed in the receiver. The coherent oscillator function is exercised by the microwave-resonant cavity; the stable local microwave oscillator function is exercised by the same cavity in cooperation with the oscillator 19. Thus this invention having neither coherent oscillator nor stable local microwave oscillator, utilizes a microwave-resonant cavity and I. F. oscillator which discharge the functions of both while at the same time avoiding the disadvantages normally inherent in the use of such devices.

Figure 3:
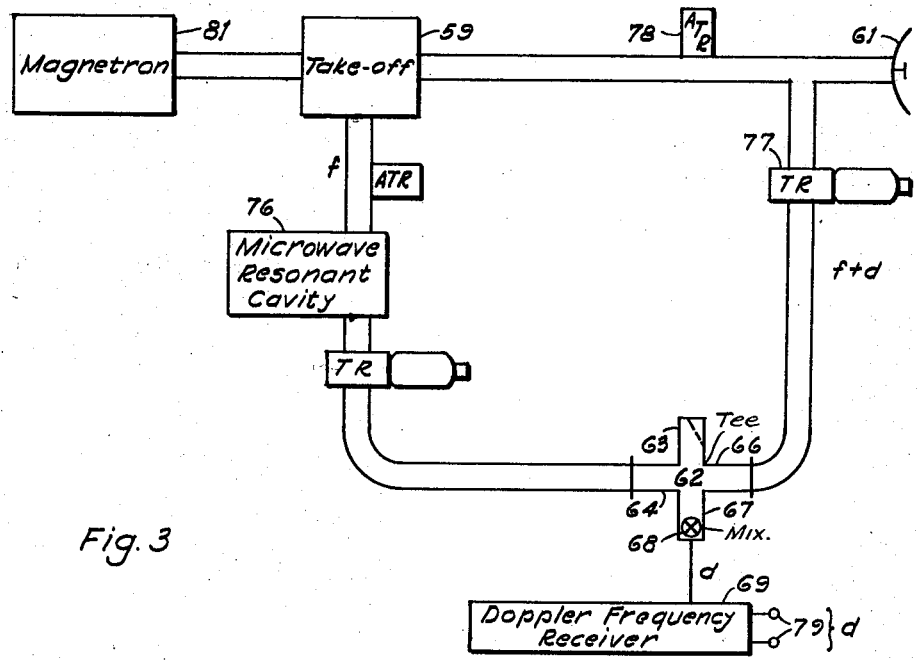
Figure 3 is a schematic diagram of a modified system.

The schematic drawing of Fig. 3 illustrates another embodiment of the invention. The constancy and freedom from drift of a cavity oscillator permits the beating of its output directly with the received dopplerized signal, thus directly creating in a mixer a signal of the Doppler frequency in a single step. This modification therefore, eliminates the generation and use of an intermediate frequency.

In Fig. 3 a magnetron generator 81 generates microwave pulses the energy of which flows in great part through take-off 59 to antenna 61. A portion of the transmitted energy is diverted by a take-off 59, which may be a directional coupler, a simple iris, or other energy-abstracting means, and enters a microwave-resonant cavity 76 tuned to the frequency $f$, emitted by generator 81. The cavity may if desired be aided in operation by TR and ATR tubes as previously described. The free (ringing) oscillations of the cavity are transmitted to one collinear arm 64 of hybrid junction 62, which through a second collinear arm 66 also receives the dopplerized reflected signal through the switching action of TR and ATR tubes 77 and 78. A third series arm 63 of hybrid junction 62 contains a nonreflecting termination and a fourth or output shunt arm 67, is energized by the energies entering collinear arms 64 and 66. This arm feeds a mixer or demodulator 68, the output of which constitutes the demodulated product of signals of frequency $f$ and signals of the dopplerized frequency $f+d$, that is, a signal of the frequency $d$, usually audio frequency energy representing the Doppler shift in frequency of the transmitted signal after reflection and reception. This energy of Doppler frequency $d$ is delivered to a Doppler frequency receiver 69, which may contain a low pass filter, an audio amplifier and an audio indicator such as an audio frequency indicating meter, and may also have terminals 79 from which the audio frequency voltage may be obtained. Thus microwave-resonant cavity 76 serves as the coherent oscillator, and there is no need for the functions of either a stable local microwave oscillator or an intermediate frequency oscillator.

Figure 4:
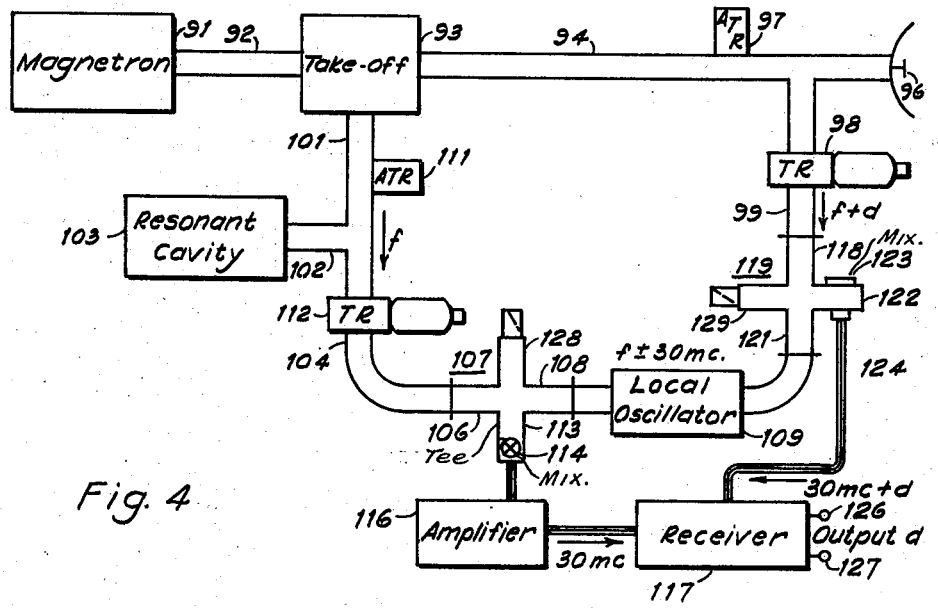
Figure 4 is a schematic diagram of a further modification of the system.

In the modification illustrated in Fig. 4 a system is depicted which is similar to that of Fig. 3 except that a free running local oscillator is used so that the signals are amplified by the receiver at intermediate frequency rather than audio frequency resulting in somewhat less noisy operation. This system also partakes of the system depicted in Fig. 1 but uses fewer components which is advantageous where weight and space are factors to be considered.

A magnetron 91, or other microwave pulse generator transmits the microwave pulse energy generated thereby through a wave guide section 92, take-off 93 and wave guide section 94 to an antenna 96 which acts both to radiate the transmitted energy and to receive the reflected energy. Inasmuch as this single antenna performs both the transmitting and receiving functions a duplexing arrangement consisting of an ATR tube 97 and a TR tube 98 are properly located with respect to the transmitting wave guide section 94 and receiving wave guide section 99 as previously described.

The take-off 93 transmits a portion of the energy generated by the magnetron 91 through the wave guide sections 101 and 102 to the resonant cavity 103 which being excited resonates substantially at and in phase with the generated frequency acting as a source of oscillations which are sustained over a period of time before dying out. These continuing signals resulting from excitation of the resonant cavity are transmitted over the wave guide section 104 to the collinear arm 106 of the hybrid junction 107, the other collinear arm 108 of which has impressed thereon signals generated by the free running oscillator 109.

If desired, as previously explained, the resonant cavity and the magnetron may be connected together and to the remainder of the circuit by a duplexing circuit consisting of an ATR tube 111 and TR tube 112.

Assuming that the generated microwave pulses are of a frequency $f$, the local oscillator 109 is operated at a frequency which departs therefrom by an amount equal to the desired intermediate frequency, for example, 30 mc. The local oscillator may generate signals which are above or below the frequency of the signals generated by the microwave generator 91 as desired and hence the frequency of the signals generated by the oscillator 109 are designated as having a frequency $f \pm 30$ mc.

This signal $f \pm 30$ mc. is impressed on the collinear arm 108, while the signal echoed by the resonant cavity 103 having a frequency $f$ is transmitted through the collinear arm 106 and both are impressed on the output shunt arm 113 of the hybrid junction 107 and the mixer or demodulator 114 carried thereby. The output of the mixer 114, therefore, constitutes the demodulated product of these two signals, namely, a signal having a frequency of 30 mc. This signal may be further amplified if desired by an amplifier 116 before being impressed on the input of the receiver 117.

The reflected signals received by the antenna 96 which have undergone a Doppler shift in frequency and therefore have a frequency of $f+d$ where $d$ is the Doppler shift in frequency are impressed through the wave guide section 99 on the collinear arm 118 of a hybrid junction 119, the other collinear arm 121 of which has impressed thereon a portion of the energy generated by the local oscillator 109. These signals are transmitted to the shunt arm 122 and the mixer or demodulator 123 carried thereby where their demodulated product is obtained and transmitted through the coaxial conductor 124 to the input of the receiver 117.

Inasmuch as the signals impressed on the mixer 123 have frequencies of $f \pm 30$ mc. and $f+d$, the difference frequency signal obtained thereby will be a signal of the frequency 30 mc.$+d$.

This signal is impressed on the input of the receiver 117 so that two signals, one having a frequency of 30 mc. and the other 30 mc.$+d$ are amplified thereby, mixed and demodulated producing an output signal at the terminals 126 and 127 which has a frequency $d$, that is, the Doppler shift in frequency. This signal, then, may be utilized in any manner to determine the relative velocity between say, an airplane carrying the described equipment and the surface of the earth from which the transmitted signals are reflected.

As in the case of the previously described systems of Figs. 1 and 3 the series arms 128 and 129 of the hybrid junctions 107 and 119 are terminated in an absorption load.

The oscillator 109 is not required in this system to be particularly stabilized since variations in the frequency of the signal generated thereby are canceled out by the various demodulating conversions. For example, if the signal frequency thereof departs from the rated value by a frequency $\Delta f$, the frequency of the signal produced by the demodulator 114 will be 30 mc.$+\Delta f$ and the frequency of the signal produced by the demodulator 123 will be 30 mc.$+\Delta f + d$. As these signals are mixed and demodulated by the receiver and since both contain the same variation in frequency $\Delta f$ this variation is canceled out and the result is still the Doppler shift frequency $d$.

What is claimed is:

1. In a system for determining the Doppler shift in frequency produced by the transmission, reflection and reception of radiant energy between two relatively moving bodies, a microwave pulse generator on a first body, means for radiating the pulse signals produced by said generator toward a second body for reflection thereby, means for receiving said reflected signals, a microwave-resonant cavity, a circuit connecting said pulse generator and said resonant cavity whereby said resonant cavity is energized by said generated pulse signals resulting in the production of free oscillations within said cavity which endure for a period of time, a mixer, a circuit interconnecting said resonant cavity and said mixer for impressing signals on said mixer having a phase and frequency representative of the phase and frequency of said free oscillations, a circuit for impressing said reflected signals on said mixer whereby a beat frequency signal is obtained, means for deriving an output from said beat frequency signal which is proportional to the difference in frequency of said radiated signals and said received signals and switch means in said circuit connecting said pulse generator and said resonant cavity for preventing the radiation of the free oscillations produced by said cavity.

2. In a system for determining the Doppler shift in frequency produced by the transmission, reflection and reception of radiant energy between two relatively moving bodies, a microwave pulse generator on a first body, means for radiating the pulse signals produced by said generator toward a second body for reflection thereby, means for receiving said reflected signals, a microwave-resonant cavity, a circuit interconnecting said pulse generator and said resonant cavity whereby said cavity is energized by said generated pulse signals resulting in the production of free oscillations within said cavity which endure for a period of time, a mixer, circuit means for impressing the energy produced by said free oscillations on said mixer, circuit means for impressing said received signals on said mixer whereby a beat frequency signal is obtained whose frequency is equal to the Doppler shift in frequency occasioned by the transmission, reflection and subsequent reception of said pulse signals switching means in the circuit interconnecting said pulse generator and said resonant cavity for preventing the transmission of signals therethrough during the intervals between the generation of pulse signals by said generator, and said means for impressing said free oscillations on said mixer including switching means for preventing the transmission of signal energy therethrough during the period of occurrence of said pulse signals.

3. In a system for determining the Doppler shift in frequency produced by the transmission, reflection and reception of radiant energy between two relatively moving bodies, a microwave pulse generator on a first body, means for radiating the pulse signals produced by said generator toward a second body for reflection thereby, means for receiving said reflected signals, a microwave-resonant cavity, a circuit interconnecting said pulse generator and said resonant cavity whereby said cavity is energized by said generated pulse signals resulting in the production of free oscillations within said cavity which endure for a period of time, a generator of continuous wave oscillations, a first mixer having its input connected to said resonant cavity and said continuous wave oscillation generator producing a first beat frequency signal from said continuous wave oscillations and said free oscillations, a second mixer having its input connected to receive said first beat frequency signal and said received signals producing a second beat frequency therefrom, a receiver including a demodulator, means impressing said second beat frequency and said continuous wave oscillations on said receiver whereby the demodulated signal derived therefrom constitutes a signal representative of the Doppler shift in frequency occasioned by the transmission, reflection and subsequent reception of said pulse signals.

4. A system in accordance with claim 3 in which filter means is connected between the output of said first mixer and the input of said second mixer.

5. A system in accordance with claim 3 in which switching means is incorporated in the circuit interconnecting said pulse generator and said resonant cavity for preventing the transmission of signal energy therethrough during the intervals between the generation of pulse signals and switching means is incorporated in the circuit connecting said resonant cavity and said first mixer for preventing the transmission of signal energy therethrough during the periods of occurrence of said pulse signals.

6. In a system for determining the Doppler shift in frequency produced by the transmission, reflection and reception of radiant energy between two relatively moving bodies, a microwave pulse generator on a first body, means for radiating the pulse signals produced by said generator toward a second body for reflection thereby, means for receiving said reflected signals, a microwave-resonant cavity tuned to the frequency of oscillations of said generated pulse signals and energized thereby whereby free oscillations are produced in said cavity which endure for a period of time at least equal to the interval occurring between the transmission of a pulse signal and the subsequent reception of its reflection, means operative by said free oscillations and said received reflected signal for determining the Doppler shift in frequency occasioned by the transmission, reflection and subsequent reception of said pulse signals and switch means for preventing the radiation of the free oscillations produced in said cavity.

7. A system for determining the Doppler shift in frequency produced by the transmission, reflection and reception of pulsed radiant energy between two relatively moving bodies comprising, a generator of pulsed microwave energy positioned on one of said bodies, means coupled to the output of said generator for radiating said pulsed energy towards the other of bodies, a microwave resonant cavity tuned to the frequency of oscillations of said generator connected to the output thereof whereby said radiated energy produces sustained free oscillations of the same frequency in said cavity, means for receiving microwave energy reflected from the other of said bodies, a mixer coupled to said cavity and receiving means producing from the received energy and the free oscillations generated by said cavity a signal whose frequency is representative of the difference in frequency between that of the transmitted and received energy, and means preventing radiation of the free oscillations generated by said cavity.

8. A system as defined in claim 7 in which additional means is provided for preventing imposition of the pulsed energy generated by said microwave generator on said mixer.

9. A system for determining the Doppler shift in frequency produced by the transmission, reflection and reception of radiant energy between two relatively moving bodies comprising, a microwave pulse generator positioned on one of said bodies, means for radiating the pulse signals produced by said generator toward the other of said bodies for reflection thereby, means including said radiating means for receiving said reflected signals, a microwave resonant cavity, a circuit interconnecting said pulse generator and said resonant cavity whereby said resonant cavity is energized by said generated pulse signals resulting in the production of free oscillations within said cavity which endure for a period of time, a mixer, a circuit interconnecting said resonant cavity and said mixer for impressing signals on said mixer having a phase and frequency representative of the phase and frequency of said free oscillations, means connected to said last mentioned circuit for preventing the imposition of said pulse signals on said mixer, a circuit for impressing said reflected signals on said mixer whereby a beat frequency signal is obtained, means for deriving an output from said beat frequency signal which is proportional to the difference in frequency of said radiated signals and said received signals, and switch means in said circuit interconnecting said pulse generator and said resonant cavity for preventing the radiation of the free oscillations produced by said cavity.

References Cited in the file of this patent
UNITED STATES PATENTS

| | | |
|---|---|---|
| 2,407,000 | Evans | Sept. 3, 1946 |
| 2,408,742 | Eaton | Oct. 8, 1946 |
| 2,426,177 | Carlson et al. | Aug. 26, 1947 |
| 2,445,895 | Tyrrell | July 27, 1948 |
| 2,460,827 | Isely | Feb. 8, 1949 |
| 2,467,670 | Hershberger | Apr. 19, 1949 |
| 2,485,583 | Ginzton | Oct. 25, 1949 |
| 2,512,144 | Emslie | June 20, 1950 |
| 2,517,549 | Earp | Aug. 8, 1950 |
| 2,543,448 | Emslie | Feb. 27, 1951 |
| 2,549,131 | Rideout | Apr. 17, 1951 |
| 2,556,669 | Albersheim | June 12, 1951 |